United States Patent [19]

Macaire et al.

[11] Patent Number: 5,230,844
[45] Date of Patent: Jul. 27, 1993

[54] PROCESS FOR PRODUCING A COMPLEX ELASTIC MOLDED STRUCTURE OF THE SANDWICH TYPE

[75] Inventors: Roger Macaire, Isère; Michel Beaudoing, Sallanches, both of France

[73] Assignee: Skis Rossignol, S.A., France

[21] Appl. No.: 553,705

[22] Filed: Jul. 17, 1990

Related U.S. Application Data

[63] Continuation of Ser. No. 240,957, Sep. 6, 1988, abandoned.

[30] Foreign Application Priority Data

Sep. 4, 1987 [FR] France .................. 87 12464

[51] Int. Cl.$^5$ .............................................. B29C 67/22
[52] U.S. Cl. .................... 264/46.7; 264/46.4; 264/46.5; 264/257
[58] Field of Search ............. 264/46.5, 46.7, 257, 264/46.4; 441/68, 74; 156/79, 245

[56] References Cited

U.S. PATENT DOCUMENTS

| | | | |
|---|---|---|---|
| 3,501,564 | 3/1970 | Snoeyenbos et al. | 264/338 |
| 3,816,573 | 6/1974 | Hashimoto et al. | 264/46.5 |
| 3,928,106 | 12/1975 | Molnar | 264/DIG. 83 |
| 3,940,468 | 2/1976 | Tunstall | 264/46.6 |
| 4,044,083 | 8/1977 | Howe et al. | 264/46.5 |
| 4,065,150 | 12/1977 | Van Auken | 156/228 |
| 4,250,585 | 2/1981 | Theriault et al. | 264/46.7 |
| 4,259,274 | 3/1981 | Tiitola | 264/46.5 |
| 4,383,955 | 5/1983 | Rubio et al. | 264/257 |
| 4,510,008 | 4/1985 | Hoshi et al. | 156/295 |
| 4,534,813 | 8/1985 | Williamson et al. | 156/194 |
| 4,590,023 | 5/1986 | Hayashi et al. | 264/46.5 |
| 4,681,725 | 7/1987 | Maruyama | 264/46.5 |
| 4,851,021 | 7/1989 | Bohrn et al. | 264/110 |

FOREIGN PATENT DOCUMENTS 2449588  9/1980  France .
58-188625  11/1983  Japan .

Primary Examiner—Allan R. Kuhns
Attorney, Agent, or Firm—Wall and Roehrig

[57] ABSTRACT

Improved process for producing a complex elastic molded structure of the sandwich type, consisting of a core of polyurethane foam (10) surrounded by a skin, of which at least a part is reinforced with a reinforcing textile sheet (5, 6) impregnated with a thermosetting resin adhering to said foam, which process consists in:
 firstly depositing on one of the faces (4) of a mold intended to be closed by a cover (2) an assembly comprising a stiffening element (12) and a semirigid reinforcing textile sheet (6), preimpregnated with a solventless, non-tacky epoxy resin,
 then closing the cover (2) of the mold (1) so as to define, together with said assembly, a volume corresponding to the volume of the core which is to be formed;
 then injecting into the volume thus defined the reactional mixture forming the polyurethane foam,
 and finally allowing the product to cool and opening the mold (1) to withdraw the resulting elastic complex molded structure.

1 Claim, 3 Drawing Sheets

PROCESS FOR PRODUCING A COMPLEX ELASTIC MOLDED STRUCTURE OF THE SANDWICH TYPE

This is a continuation of application Ser. No. 240,957, filed Sep. 6, 1988, now abandoned.

The invention relates to a process for producing a complex molded structure, more particularly an industrial, automatable process of this type; it also relates to composite structures obtained in this manner.

In the remainder of the description and in the claims the expressions "textile sheets" and "reinforcing sheets" include not only individual sheets of parallel unidirectional threads, optionally superimposed, but also bidirectional cloths, such as fabrics (woven, knitted or stitched), netting, braiding, and also webs, non-wovens and complexes formed from such materials, particularly by needle bonding, stitching or the like.

For the production of composite flexion strips it has already been suggested to stack unidirectional sheets coated with unpolymerized resin (complexes often called "preimpregnated sheets" or "prepregs"), to place the complex in a mold to compact the material by pressure, and finally to apply heat in order to harden the resin. In this way a quasi-homogeneous composite material suitable as a substitute for steel spring leaves is obtained.

Unfortunately, this technique is still expensive and the material obtained is heavy, so that its industrial uses are considerably limited.

It has also been proposed to produce composite strips by joining a core of rigid expanded thermosetting resin to at least one reinforcing sheet intended to provide the structure with mechanical strength, particularly under stress, while the core lightens the structure.

Various industrial processes exist for the assembly of these composite strips.

The process comprising adhesive bonding of the component parts with the application of heat and pressure, although in use, is lengthy and expensive and gives rise to random stresses in the final composite structure.

The so-called "wet process" consists in placing in the mold sheets freshly impregnated with a first thermosetting resin, particularly an epoxy resin, then a light core, for example of wood or expanded foam of a another rigid thermosetting material, for example polyurethane. When the assembly is subjected to pressure and heat, the first lamination resin serves as adhesive and the sheets are thus bonded to the core. This technique, which is likewise in use, ensures good adhesion of the components to one another, but is still lengthy and expensive. In addition, the utilization of freshly impregnated reinforcing sheets makes it necessary to use these sheets within a very short time (a few minutes) and is difficult to automate because these sheets are tacky to the touch.

It was then proposed to replace these freshly impregnated sheets, the use of which is delicate, by preimpregnated sheets, that is to say sheets coated with unpolymerized resin but only slightly or not at all tacky to the touch. For example, in French Patent FR-A-2 435 343 a process has been described for the preparation of objects having a core of polyester foam covered with a cloth impregnated with polyester resin, this process taking advantage of the exothermicity of the cross-linkage of the foam. This technique, which is suitable for the production of bulky bodies subjected to little deformation, such as sailboards, has the disadvantage of being restricted to polyester and therefore of offering only low adhesion and expansion possibilities, thus resulting in high density.

It was then proposed first to place in a mold prepolymerized, and therefore rigid, sheets of reinforcing and mechanization textiles, then to inject into this mold the liquid monomer components of a rigid expanded thermosetting resin, for example isocyanates and polyhydroxylated compounds, in order to prepare a polyurethane foam. For example, in U.S. Pat. No. 3,940,468 a process of the type in question is described in which, in order to assist the adhesion of the reinforcing textile material to a rigid core of polyurethane foam, use is made of polyester impregnating resins having special characteristics, once again taking advantage of the exothermicity of the foam polymerization reaction. This very lengthy process has the same disadvantages as those described above because of the stickiness of the polyester impregnated sheets. Furthermore, this technique does not make it possible for other stiffening elements, such as steel strips, to be incorporated in the assembly, because the poor adhesive properties of resins, particularly polyester, do not ensure adequate bonding of these elements to one another.

SUMMARY OF THE INVENTION

The invention obviates these disadvantages. It relates to an improved process for the production of an elastic complex molded structure of the sandwich type, comprising a rigid expanded, and therefore light, core reinforced by textile sheets which adhere firmly to the core, which process is easy to carry out, quick and economical, can be automated, and results in complex structures having excellent mechanical properties and low induced stresses, which are therefore reproducible, so that this process provides homogeneous structures.

This process for producing a complex elastic molded structure consisting of a core of polyurethane foam, surrounded by a skin, of which at least a part is reinforced with a reinforcing textile sheet impregnated with a thermosetting resin adhering to said polyurethane foam, consists in:

firstly, depositing on at least one face of a mold intended to be closed by a cover an assembly comprising a first stiffening element and a first semirigid reinforcing textile sheet, preimpregnated with a solventless, non-tacky epoxy resin, to which an expanding polyurethane foam can adhere and whose adhesive and stratification properties are developed by a rise in temperature;

then closing the cover of the mold so as to define, together with said assembly, a volume corresponding to the volume of the core which is to be formed;

then injecting into the volume thus defined the reactional mixture of the two components of the polyurethane foam, namely polyols and isocyanates, which expand and adhere to the reinforcing textile sheet, then harden in situ by an exothermic reaction, thus effecting a rise in temperature capable of at least partly developing the adhesive and stratification properties of the sheet preimpregnated with epoxy resin;

and finally allowing the product to cool and opening the mold to withdraw the resulting elastic complex molded structure.

In other words, one of the original features of the invention consists in replacing the wet impregnated fabric with a preimpregnated fabric, which is certainly known in another connection, but with care being taken to select, from all the prepregs available, the epoxy prepregs which, in combination with the polyurethane foam, cooperate at the interface with the stiffening element to form an adherent assembly enabling the resulting complex structure to take deformations of great amplitude without giving rise to permanent deformation or entailing delamination phenomena.

In the Patent U.S. Pat. No. 3,940,468 mentioned above, which makes use of a polyester impregnated textile element, it is not possible, as has already been stated, to incorporate a stiffening element, particularly a metallic element, without risk of delamination.

During its expansion, and its hardening, the foam gives rise to an exothermic reaction and produces a considerable increase in pressure in the mold, and against the walls of the mold, which has the effect of pressing the reinforcing and stiffening sheets against the mold walls, thus bringing them close to the surface of the composite structure.

The chemical reaction which occurs after the injection phase and during the expansion must necessarily be exothermic. The foam thus formed therefore adheres because of this action to the reinforcing textile sheets. The heat thus liberated by this reaction contributes towards initiating the hardening reaction of the non-cross-linked impregnation resin in the reinforcing sheets. The complete hardening of the foam takes place before the complete hardening of said resin, which in turn can be completely cross-linked by additionally heating the mold. It is obviously quite possible to remove the molding from the mold when the foam has hardened and when the resin is only starting to harden in order to complete the hardening in a stove. The intimate connection between the second impregnating resin, which constitutes the matrix of the reinforcing sheet, and the first expanded resin ensures excellent bonding between the different component elements of the complex structure.

As the result of the invention it is thus possible to produce elastic complex molded structures with complete freedom from the disadvantages of the so-called "wet assembly" process and from the disadvantages of the process of the injection of a foam core. Moreover, the present invention is particularly advantageous for the production of strips, beams, or any structure subjected to stresses of great amplitude, where very slight or even zero permanent deformation is desired.

In the description and claims the expression "non-tacky" designates a material which at ambient temperature does not adhere to the fingers.

Advantageously, in practice:

close to the face intended to come into contact with the cover a superimposition similar to that mentioned above is deposited, comprising a second stiffening element and a second semirigid reinforcing textile sheet, likewise preimpregnated with a solventless, non-tacky epoxy resin whose adhesive and stratification properties in relation to the polyurethane foam are developed by a rise in temperature, in such a manner as to define the aforesaid volume which is to be injected;

the reinforcing textile sheet is selected from the group comprising unidirectional sheets, bidirectional sheets: cloths, fabrics, nonwoven netting, knitted-stitched sheets, and is composed of high mechanical performance mineral or synthetic fibers selected from the group comprising glass, boron, carbon, the polyaramides, alone or mixed;

the reinforcing textile sheet is preimpregnated by passing a bidirectional cloth or an elementary unidirectional sheet through a solventless bath of epoxy resin, then dried, and finally prehardened by maturing, for example at ambient temperature;

the stiffening element is selected from the group consisting of a steel plate, an aluminum based alloy plate, a phenol laminate, and a rigid prepolymerized laminated structure;

in the case of a mold having the shape of a strip of rectangular cross-section the first reinforcing textile sheet and the first stiffening element are placed at the bottom of the mold, then rigid plates are deposited at right angles to this assembly, along the two side flanks of the mold, in such a manner as to form two edges, on which are laid the second stiffening element and the second reinforcing textile element;

the rise in temperature due to the exothermic reaction, which develops the adhesive properties, is supplemented by additional heating of the mold;

the outer faces of the first and second preimpregnated reinforcing textile sheets are covered with a sheet of plastic material.

In an alternative embodiment the preimpregnation of the reinforcing textile sheet may be effected in situ by placing in the mold a stack of textile sheets and sheets or films of epoxy resin, which are then dispersed into the textile sheet when the temperature is subsequently raised.

In another variant, an apertured tubular reinforcing textile structure may likewise be placed in the interior of the mold. In this way, this structure is embedded in the expanded core and generally assumes a cylindrical or ovoid section, thus providing the molded structure with longitudinal torsional strength and improving lateral flexural strength.

In another embodiment the structure may contain viscoelastic elements absorbing vibrations, such as for example a sheet of elastomer, which optionally are located in appropriate positions, for example inside the core, or else between the stacks of reinforcing sheets, or in these reinforcing sheets. This configuration is advantageous when selective damping of certain vibratory modes inherent to the structure is desired, as for example in the manufacture of skis.

BRIEF DESCRIPTION OF THE DRAWINGS

The manner in which the invention may be put into practice and the advantages which result from it will emerge more clearly from the examples of embodiment given below by way of indication and without constituting a limitation, in conjunction with the accompanying drawings.

DETAILED DESCRIPTION OF THE INVENTION

EXAMPLE 1

Figure 1:
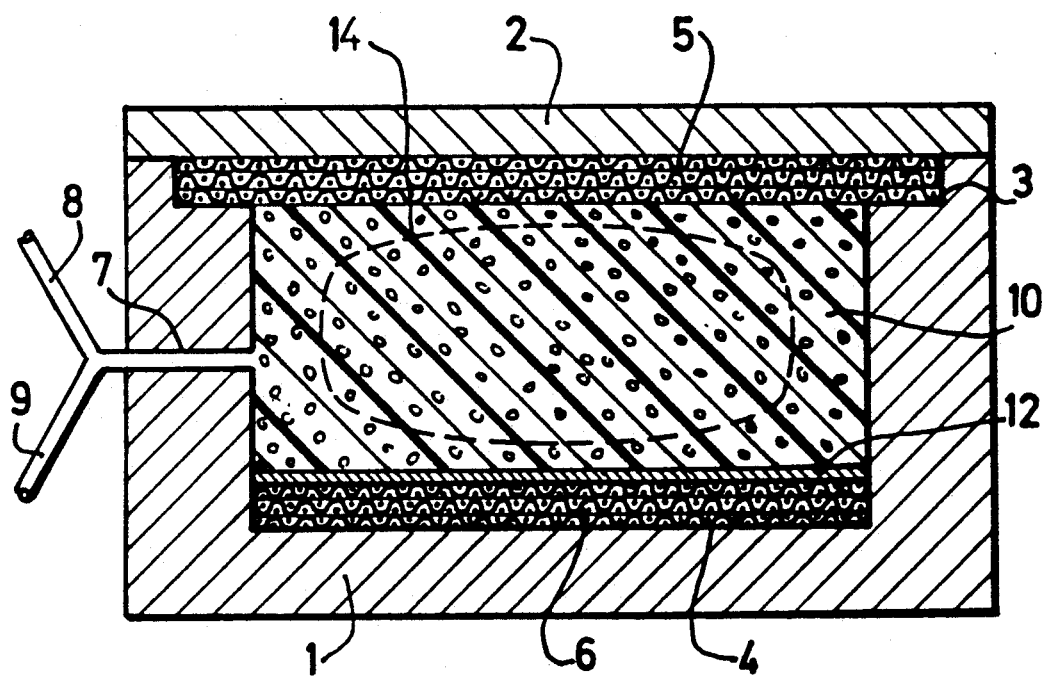
FIG. 1 shows schematically in section an injection mold according to the invention.

Use is made of a mold, for example of steel, consisting of a parallelepiped (1) of 300×8×3 centimeters, closed by a cover (2) and having a setback (3) on the top.

In the bottom (4) of this mold and in the setback (3) is placed a stack of three preimpregnated fabrics (5) and (6) respectively, consisting of knitted stitched glass fibre material (trade mark ROVINAP of Etablissement Les Fils d'Auguste Chomarat, Mariac, France), with a weight of about 730 grams per square meter, dip preimpregnated with a solventless bisphenol A based epoxy resin containing a hardening agent, such as an aliphatic amine. The resin content expressed as resin in relation to total weight of fabric+resin is about 25% after expression by means of squeeze rollers.

This preimpregnated material (prepreg) is stored at ambient temperature (25°) for about five hours to ensure the maturing of the epoxy resin. A dry impregnated fabric, that is to say one which is not tacky, is obtained, which is easily cut into bands and which can be stored several days at ambient temperature, or even several weeks at 5° C.

By way of a channel (7) provided for the purpose in the walls of the mold the monomers making it possible to prepare the rigid expanded resin (10) in situ in the mold are injected from two pipes (8) and (9) respectively in a high pressure mixer head. A polyol is for example injected at (8) and an isocyanate at (9) in order to obtain a core (10) of cellular polyurethane which is rigid after expansion and hardening.

When the reaction is initiated in situ in the mold, foam is formed which tends to occupy the entire volume available and thus to press the cloths (5, 6) against the top and bottom walls (2) and (4) respectively. Furthermore, and above all, this reaction is exothermic. The reaction is allowed to continue until the foam is expanded and starts to harden. During this exothermic phase the impregnating epoxy resin of the reinforcing sheets (5, 6) is thus softened. This exothermic action then heats the mould and causes the impregnating epoxy resin to assume the liquid state, thereby developing the adhesive and wetting properties of this resin and achieving good lamination of the assembly.

The temperature is maintained for a few minutes in order to achieve satisfactory hardening.

After cooling, the mold is emptied. In this way strips of 300×8×3 centimeters are obtained which are perfectly suitable as flexion strips.

It is obvious that the foam may be injected either on one side or at one end of the mold.

EXAMPLE 2

Before the first resin (10) is injected, a conductive metal plate (12) of aluminum alloy known as ZICRAL (registered trademark of CEGEDUR) of a thickness of 1.5 millimeter is interposed on the stack of preimpregnated cloths (6) disposed at the bottom (4) of the mold (1).

This type of an isotropic reinforcement will increase the torsional and the longitudinal and transverse flexural rigidity of the beam produced in this manner.

EXAMPLE 3

Example 1 is repeated, but inserting a highly apertured tubular textile element (14) into the mold before the injection of the first resin (10).

After injection of the resin (10), a reinforcement (14) of avoid shape is thus obtained in the interior, thereby improving longitudinal torsional strength and lateral bending strength.

EXAMPLE 4

During the production of the knitted-stitched reinforcing material (5, 6) a viscoelastic elastomer thread having a high coefficient of damping is periodically inserted into said material.

Strips suitable for replacing steel spring leaves for automobiles are thus obtained.

EXAMPLE 5

Example 1 is repeated, but inserting, before the injection of the foam (10), between the top stack (5) and said foam (10) a viscoelastic elastomer sheet having a high coefficient of damping.

Strips particularly suitable for the automobile industry are thus obtained.

EXAMPLE 6

Figure 2:
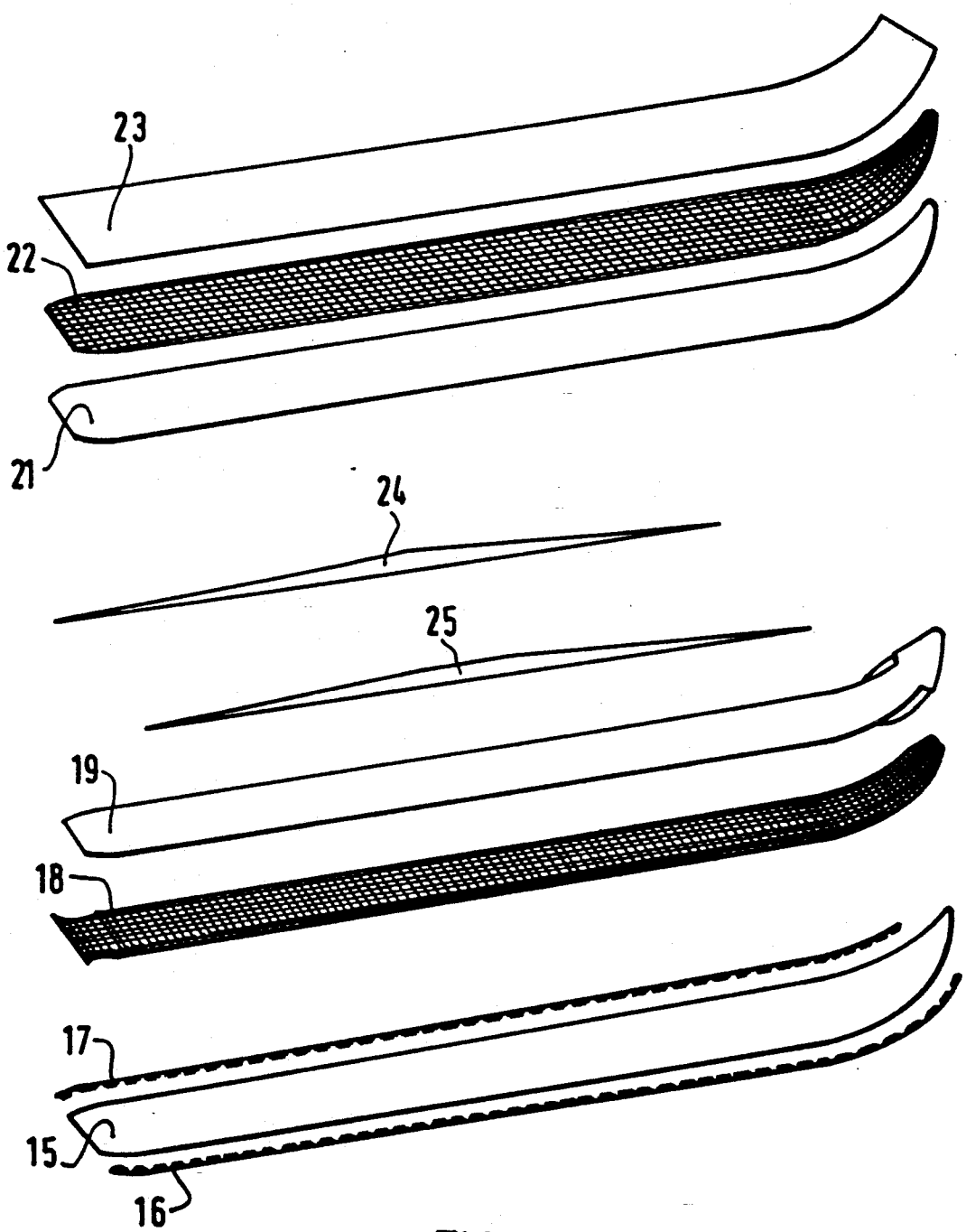
FIG. 2 is an exploded schematic view of a ski constructed in accordance with the present invention.
Figure 3:
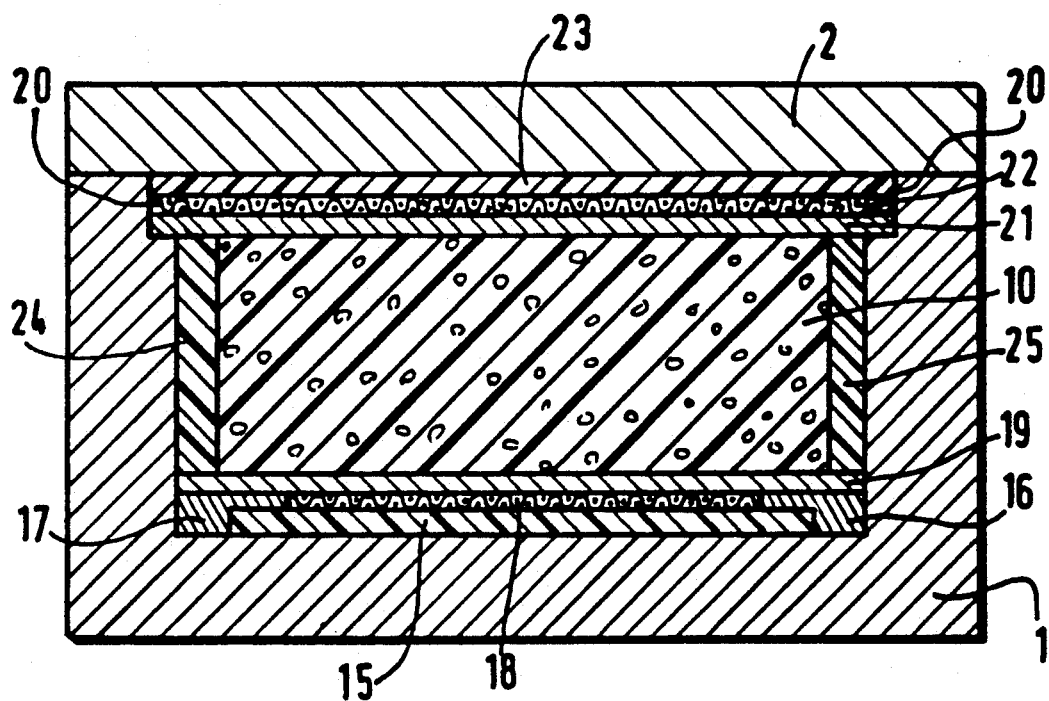
FIG. 3 is a cross-section of a ski according to FIG. 2.

A ski is produced in accordance with the present invention, its main component parts being shown in FIG. 2. A polyethylene sole (15) of a thickness of 10 to 12 tenths of a millimeter is first placed at the bottom of the mold. Steel edges (16) and (17) are placed above this sole, one on each side of the side walls of the mold (1), and are held in place in known manner, for example by means of permanent magnets (not shown) situated under the mold.

A rigid preimpregnated reinforcing sheet (18) is then placed above the assembly formed in this manner, said sheet being made of a knitted-stitched glass fiber cloth (registered trade mark ROVINAP) dip impregnated with an epoxy resin. As in Example 1, this preimpregnated fabric had previously been stored at ambient temperature for about five hours in order to ensure the maturing of the epoxy resin, so as to obtain a dry, nontacky impregnated fabric. A strip (19) of ZICRAL of dimensions similar to those of this reinforcing preimpregnated fabric sheet (18) is then placed over the latter. This strip (19) is held and pressed firmly against the sheet (18) by means of longitudinal metal rods (not shown) held in place, once again, by means of permanent magnets situated under the mold.

Another strip (21) of ZICRAL having characteristics similar to the ZICRAL strip (19) is then placed on a setback (20) in the mold (1).

Above this strip (21) is placed another semirigid reinforcing sheet (22) preimpregnated with epoxy resin and having the same characteristics as the sheet (18).

Finally, above this sheet is placed a strip (23) of ABS (acrylobutylstyrene) resin, which is intended in particular to serve as decoration support for the ski.

Two edges (24) and (25), for example made of polyethylene, ABS, phenolic resin or the like, are also placed on the side faces of the space left free between the two ZICRAL strips (19, 21) and against the walls of the mold.

As in Example 1, monomers enabling the polyurethane resin to be prepared are then injected from a duct provided in the mold. The reaction, which is initiated in-situ, first brings about the expansion of the foam, which has the consequence of pressing the fabric (18) and strip (19) on the one hand, and the strip (21) and fabric (22) on the other hand respectively against the bottom and top walls of the mold. Furthermore, the heat liberated by this polymerization reaction gives rise to the cross-linking of the epoxy resin contained in the sheets (18) and (22), thus making it possible to effect on the one hand the adhesion of the ZICRAL strips (19) and (21) to the sheets (18) and (22), and on the other hand the adhesion of the polyethylene sheet (15) to the sheet (18) and the adhesion of the ABS sheet (23) to the sheet (22).

The complete cross-linking of the epoxy resin contained in the sheets (18) and (22) is achieved by additional heating of the mold.

After the molds have cooled, a ski is obtained which has excellent flexural properties.

EXAMPLE 7

Example 1 is repeated replacing the three prepreg sheets (5, 6) with three of these dry sheets in alternation sandwiched between three epoxy resin films 0.5 mm thick.

When the temperature is increased, the resin melts and impregnates the sheets in situ. Results similar to those of Example 1 are obtained.

It is obvious that the symmetrical structure thus described may be somewhat modified. Depending on the wishes of the user, the present invention in fact is perfectly applicable to the production of a structure whose symmetry may, for example, be reversed. This structure is then made in a form containing, in succession, a stiffening element, particularly of Zicral, then a preimpregnated reinforcing sheet, then the polyurethane core, followed by another preimpregnated reinforcing sheet, and finally another stiffening strip. In another embodiment it is quite conceivable to envisage, on each side of the polyurethane core, a structure comprising respectively a stiffening element enclosed between a plurality of preimpregnated reinforcing sheets, or else a regular or irregular alternation of preimpregnated reinforcing sheets and stiffening elements.

In another embodiment it is also possible to envisage, within a parallelepipedic mold, the presence of an impregnated reinforcing sheet on three faces of the mold and the positioning, by the means previously described, of a stiffening strip—in this particular case of Zicral—on only one of these faces.

The examples described in the foregoing description mention only strips of parallelepipedic shape, but it is obvious that any cylindrical polygonal U or V shape is within the scope of the present invention.

The process according to the invention offers numerous advantages over the techniques employed hitherto. The following may be mentioned:

the fact that dry, non-tacky parts are used, which are therefore easy to handle, so that the process can be automated;

the absence of solvent in the resin impregnating the sheets, which facilitates the operations, simplifies the impregnation installation, and thus reduces investment costs;

simplicity, because a finished object is produced in a single operation, thus achieving an appreciable saving in respect of molds;

the ease of incorporating inserts or of covering the different side faces of the composite structure.

In this way, as already stated, this process can advantageously be used for the production of rigid or flexural strips or beams, particularly when stiffness associated with lightness, or else flexibility associated with strength and lightness, is desired.

Strips or beams of this kind may have numerous applications, particularly in the automobile industry, in the aerospace industry, in aeronautics in sport (tennis, squash or badminton rackets, ski poles, skis, and so on), in building and public works, for the production of panels and frame members, particularly self-supporting members in the electrical industry (for the production of sheathing, insulating lines), and so on.

We claim:

1. A process for molding a reinforced ski of the sandwich type that includes the steps of pre-impregnating a reinforcing textile sheet containing reinforcing fibers by passing said sheet through a solventless bath of epoxy resin;

drying and pre-hardening said sheet to a non-tacky state by maturing said sheet at ambient temperature so that the sheet can be handled without adhering to handling equipment;

forming said sheet to a desired shape and placing the sheet and a stiffening member in contact against a first wall of a mold cavity to form an assembly;

closing the mold cavity to establish a volume behind said assembly;

injecting a polyol component and an isocyanate component into said volume so that they react exothermically to produce a polyurethane core having a temperature high enough to cause cross-linking of said epoxy resin;

allowing the core to expand into contact against said assembly to effect a cross linking rise in temperature of said epoxy resin in said impregnated textile sheet to develop its wetting and adhesive properties so that the core, and the reinforcing sheet are bonded together about the stiffening member into a sandwich-like structure as the epoxy resin and core cure, to a solid intimately physically and chemically linked structure; and removing the structure from the mold cavity after the core and epoxy resin have at least partially cured.

* * * * *